United States Patent
Dipietro et al.

(10) Patent No.: US 9,793,519 B2
(45) Date of Patent: *Oct. 17, 2017

(54) POLYMER FUSED BATTERIES

(71) Applicant: INTERNATIONAL BUSINESS MACHINES CORPORATION, Armonk, NY (US)

(72) Inventors: Richard A. Dipietro, Campbell, CA (US); Thomas J Fleischman, Poughkeepsie, NY (US); Richard Hutzler, Tucson, AZ (US); Keith B. Maddern, Tucson, AZ (US); William M. Smith, Jr., Rochester, MN (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 238 days.

This patent is subject to a terminal disclaimer.

(21) Appl. No.: 14/820,131

(22) Filed: Aug. 6, 2015

(65) Prior Publication Data
US 2015/0349321 A1 Dec. 3, 2015

Related U.S. Application Data

(63) Continuation of application No. 13/365,762, filed on Feb. 3, 2012, now Pat. No. 9,130,200.

(51) Int. Cl.
*H01M 2/34* (2006.01)
*H01M 2/02* (2006.01)
(Continued)

(52) U.S. Cl.
CPC ......... *H01M 2/0222* (2013.01); *H01M 2/026* (2013.01); *H01M 2/0272* (2013.01); *H01M 2/0277* (2013.01); *H01M 2/0285* (2013.01); *H01M 2/0295* (2013.01); *H01M 2/34* (2013.01); *H01M 10/4235* (2013.01); *H01M 2200/00* (2013.01); *H01M 2200/103* (2013.01);
(Continued)

(58) Field of Classification Search
CPC ....... H01M 10/4235; H01M 2200/103; H01M 2200/30; H01M 2/0222; H01M 2/026; H01M 2/0272; H01M 2/0277; H01M 2/0285; H01M 2/0295; H01M 2/34
See application file for complete search history.

(56) References Cited

U.S. PATENT DOCUMENTS 8,617,732 B2   12/2013   Hutzler et al.
2012/0244409 A1  9/2012   Ok

FOREIGN PATENT DOCUMENTS

EP   2528130 A1   11/2012
JP   59040458     3/1984
(Continued)

OTHER PUBLICATIONS

Yasui et al., "Experimental and Clinical Study of the Hazard by an Alkaline Battery Ingestion", The Japanese Journal of Gastronenterological Society Mar. 1984, vol. 17 No. 3, p. 586-594.

Primary Examiner — Carlos Barcena
(74) Attorney, Agent, or Firm — Griffiths & Seaton PLLC

(57) ABSTRACT

Polymer-fused batteries are provided. The battery includes a casing, an anode coupled to the casing, an electrical source disposed between the casing and the anode, and a fuse. The polymer fuse comprises an electrically-conductive material formulated to decompose upon contact with a bodily fluid.

21 Claims, 4 Drawing Sheets

(51) Int. Cl.
*H01M 10/04* (2006.01)
*H01M 10/42* (2006.01)

(52) U.S. Cl.
CPC .... *H01M 2200/30* (2013.01); *Y10T 29/49108* (2015.01); *Y10T 29/49115* (2015.01); *Y10T 29/49117* (2015.01)

(56) References Cited

FOREIGN PATENT DOCUMENTS

| | | |
|---|---|---|
| JP | 59044762 | 3/1984 |
| JP | 04312762 A | 11/1992 |
| WO | 2012039632 A3 | 3/2012 |
| WO | 2012164429 A1 | 12/2012 |

POLYMER FUSED BATTERIES

CROSS REFERENCE TO RELATED APPLICATIONS

This application is a Continuation of U.S. patent application Ser. No. 13/365,762, filed on Feb. 3, 2012.

BACKGROUND OF THE INVENTION

Field of the Invention

The present invention relates in general to batteries, and in particular, to button style batteries.

Description of the Related Art

Batteries are employed as electrical sources for use in portable devices that utilize electricity to function. As such, there is often strong motivation to make batteries as small as possible while still providing the necessary high current density. Li/ion batteries, for example, are ideally suited for this application as they are capable of a high current density while providing exemplary small form factors including button style, coin style, and disk style batteries. These batteries can be extremely useful because of their ability to provide a current source without taking up much space and being quite light. As a consequence, these batteries allow for smaller and lighter devices to be created which can provide considerable utility to a user.

Such batteries are often used in devices where size and weight is important. For example, batteries having one of these small form factors are often used in such devices as watches, calculators, or even musical gift cards where a larger battery may defeat the purpose or utility of such a device. In addition, these batteries are often used as reserve power for numerous larger devices. For example, button, coin, or disk style batteries are often used in computers to maintain an internal clock or BIOS memory in the case of loss of power or unplugging of the computer from an outside power source. Because of their general utility, these small form factor batteries have become ubiquitous.

SUMMARY OF THE INVENTION

Unfortunately, the advantages of small form factor batteries is somewhat diminished by their danger to children. Due to their small form factor, these batteries are often swallowed by children and can become lodged in various parts of a child's body. Consequently, severe danger or death to the child may result. In particular, when lodged within the body, a charged battery will induce a current to the surrounding tissue, which may damage that affected tissue.

An improved battery has been provided that incorporates the utility of small form factor batteries while decreasing the risks of harm in the form of current-induced tissue damage in the event of swallowing by an adult or child. The improved battery provides features that protect against current flow that may be induced if ingested.

In an embodiment, by way of example only, the battery includes a casing, an anode coupled to the casing, an electrical source disposed between the casing and the anode, and a polymer fuse. The polymer fuse comprises an electrically-conductive material, the material becoming non-conductive upon contact with a suitable bodily fluid thus rendering the battery essentially non-functional.

BRIEF DESCRIPTION OF THE DRAWINGS

In order that the advantages of the invention will be readily understood, a more particular description of the invention briefly described above will be rendered by reference to specific embodiments that are illustrated in the appended drawings. Understanding that these drawings depict only typical embodiments of the invention and are not therefore to be considered to be limiting of its scope, the invention will be described and explained with additional specificity and detail through the use of the accompanying drawings, in which.

DETAILED DESCRIPTION OF THE DRAWINGS

The illustrated embodiments below provide a battery that reduces a likelihood of tissue damage and/or death if ingested. Generally, the battery includes a casing, an anode coupled to the casing, an electrical source disposed between the casing and the anode, and a polymer fuse over at least a portion of the anode. The polymer fuse comprises an electrically-conductive material formulated to provide electrical communication between the anode cap and the electrical source, the material becoming non-conductive upon contact with a suitable bodily fluid thus rendering the battery essentially non-functional. The aforementioned battery can have small form factors include button style, coin style, or disk style batteries.

Figure 1:
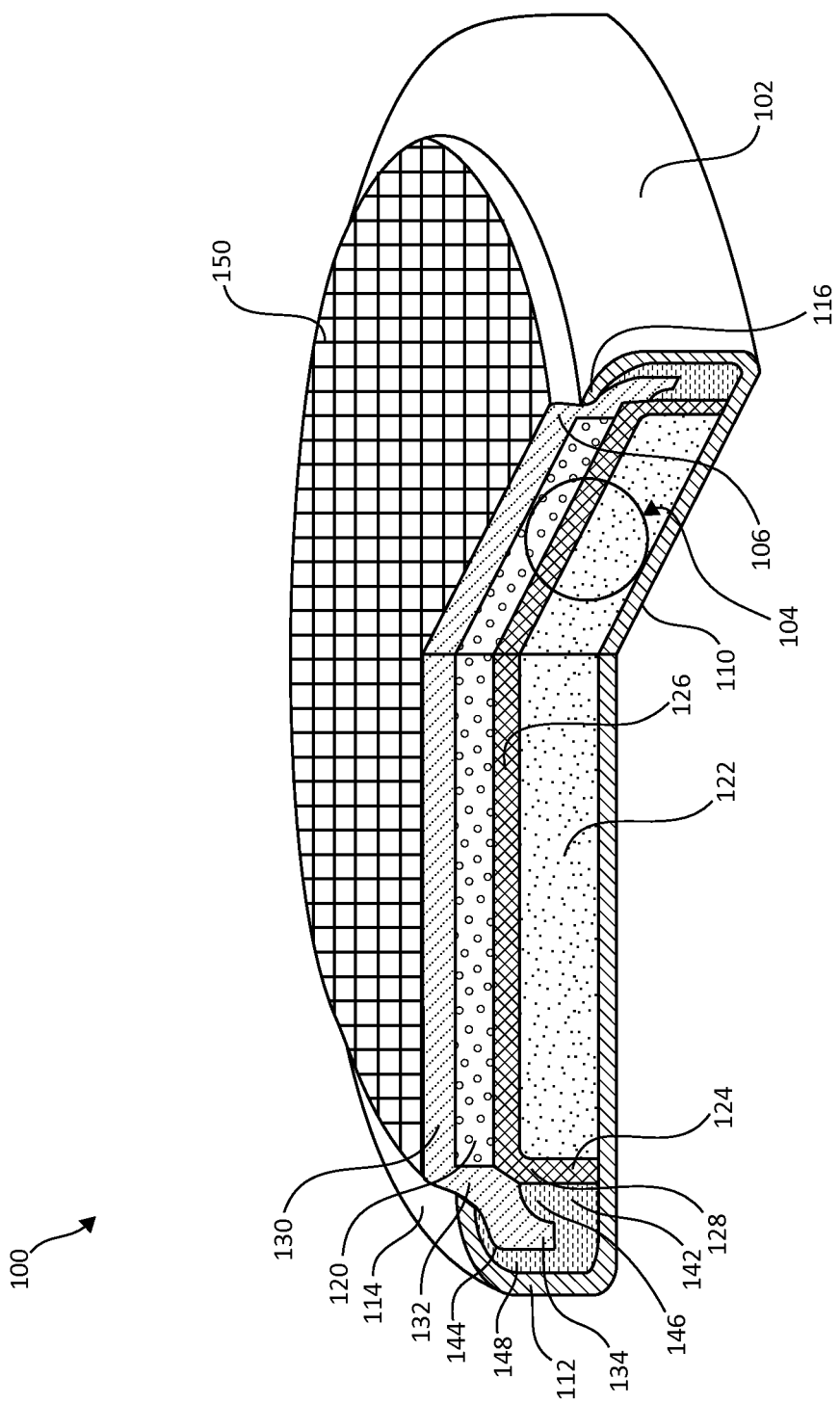
FIG. 1 is a cutaway view of a battery, according to one embodiment of the present invention.

FIG. 1 is a cutaway view of a battery 100, according to an embodiment. The battery 100 has a button style form factor. The battery 100 is depicted as resting on a lower end (not visible) with visible upper end and sides of the battery. In an embodiment, the battery 100 has a substantially cylindrical shape with a shorter height than diameter, similar to a button, disk or coin. As used herein, the terms "button battery," "button form factor," and "button style battery" are used to describe batteries having any of the button, disk, or coin style form factors. It will be understood by one skilled in the art in light of the present disclosure that the form factors depicted herein are exemplary only and can vary considerably without departing from the scope of the present invention.

According to one embodiment, the battery 100 includes dimensions that meet one or more battery dimension standards. For example, standard setting organizations create dimension standards for batteries such that batteries made by different manufactures can be made to conform to the dimension standards. Consumers may then be able to interchange batteries from different manufacturers in a single device.

With reference to FIG. 1, the battery 100 includes a casing 102, an electrical source 104, and a polymer fuse 106. The battery 100 is depicted with substantially circular and flat upper and lower ends. In an embodiment, the casing 102 provides a structural support for other components of the battery 100 and includes a planar plate 110 and a sidewall 112. The planar plate 110 defines a lower end of the battery 100, and the sidewall 112 extends from an outer diameter of the exposed planar plate 110 to form a side of the button style battery 100. In accordance with an embodiment, the sidewall 112 is formed substantially perpendicular to the planar plate 110 and has a lip portion 114 that protrudes radially inwardly a distance to define an open top 116.

The casing 102 is formed from a wide variety of materials. In one embodiment, the casing 102 is formed from a single material, such as an electrical conductor or an electrical insulator. According to another embodiment, the casing 102 includes one or more materials such as an electrical conductor and an electrical insulator. According to one embodiment, at least a portion of the casing 102 includes a conductor, which acts as a terminal of the battery 100.

The electrical source 104 includes an anode 120, a cathode 122, and a separator 124. The electrical source 104 may be any type of electrical source known in the art. Often, electrical sources within batteries include one or more electrochemical cells, which act as the anode 120 and the cathode 122 and convert chemical energy into electricity. Exemplary types of electrochemical cells include, but are not limited to, lithium ion, alkaline, zinc-carbon, nickel-cadmium, silver oxide, lithium, or any other electrochemical electrical source known in the art. One of skill in the art will recognize the considerable variation of materials and configurations for the electrical source 104 well known in the art and that the present disclosure embraces use of any of these materials or configurations within its scope.

The anode 120 and the cathode 122 are generally substantially similarly shaped. For example, as illustrated in FIG. 1, the anode 120 and the cathode 122 are disk-shaped. In an embodiment, the anode 120 and cathode 122 have substantially equal diameters. In alternate embodiments, the anode 120 is larger than the cathode 122, or vice versa. Although the anode 120 is shown as having a greater thickness than the cathode 122, the cathode 122 is thicker than the anode 120 in other embodiments.

The separator 124 maintains the anode 120 and cathode 122 separate from each other to prevent short circuits while still allowing ionic transport from the anode 120 to the cathode 122. In an embodiment, the separator 124 envelops and maintains the cathode 122 apart from the anode 120. For example, the separator 124 positions the cathode 122 against an interior surface of the planar plate 110 of the case 102. Suitable materials from which the separator 124 is formed include, but are not limited to, silicones, polystyrenes, polyethylenes, nylons, teflons and the like.

According to an embodiment, the separator 124 has a planar member 126 and a side member 128. The planar member 126 is disposed between the anode 120 and the cathode 122 and is dimensioned to extend over substantially an entirety of an upper surface of the cathode 122. The side member 128 extends axially from the planar member 126 toward the planar plate 110 to surround a side surface of the cathode 122.

The polymer fuse 106 is disposed over the electrical source 104 and is configured to render the battery 100 inoperable, when the battery 100 is swallowed or in contact with a bodily fluid. In an embodiment, the polymer fuse 106 is formed over the anode 120. According to another embodiment, the polymer fuse 106 includes a planar portion 130, a side portion 132, and an attachment flange 134. The planar portion 130 is disposed continuously over and is in contact with the anode 120, and the side portion 132, which extends axially from the planar portion 130, continuously surrounds a side surface of the anode 120 and contacts the separator 124. To retain the polymer fuse 106 within the casing 102, the attachment flange 134 extends from the side portion 132 and is configured to be inserted into a gasket 142 disposed in the casing 112. More particularly, the gasket 142 has a groove 144 defined between an inner wall 146 and an outer wall 148, and the attachment flange 134 is inserted into the groove 144.

In an embodiment, the polymer fuse 106 comprises an electrically-conductive material formulated to allow electricity to be conducted to the anode 120 when the polymer fuse 106 is intact, but to be rendered non-conductive as described above upon contact with the bodily fluid. According to an embodiment, the electrically-conductive material comprises a block copolymer formulated to at least partially decompose in caustic and/or acidic environments. The block copolymer includes a hydrophobic block and a hydrophilic block. As used herein, the term "block copolymer" is a copolymer that comprises more than one species of monomer, wherein the monomers are present in homogenous larger units or blocks. Each block of the specific monomer comprises repeating sequences of only that monomer, uninterrupted by other monomers. The term "monomer," as used herein, is defined as a molecule that can undergo polymerization thereby contributing constitutional units to the essential structure of a macromolecule, an oligomer, a block, a chain and the like. The term "polymer," as used herein, is a macromolecule comprising multiple repeating smaller units or molecules (monomers) bonded together covalently. The polymer may be a natural polymer or a semi-synthetic polymer or a fully synthetic polymer. The term "copolymer," as used herein is a polymer derived from more than one chemical species of smaller unit or monomer. The monomers of the block copolymer may be used individually and in combinations thereof in accordance with the method of the present invention.

The hydrophobic block is formulated to provide a matrix for the conductive block such that, upon exposure to suitable bodily fluids and subsequent decomposition of the conductive block, as described below, the overall polymer superstructure is retained. In an embodiment, the hydrophobic block comprises a polystyrene chain including an R-group. In an example, the polystyrene chain has the following formula:

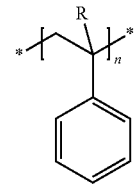

wherein R is selected from a group consisting of hydrogen, methyl, and trifluoromethyl, and n is an integer from 0 to 500. One of skill in the art will recognize the considerable variation of materials available for the hydrophobic block.

In another embodiment, the hydrophilic block comprises another material that is conductive and that is capable of undergoing self-assembly into discrete domains in the presence of the hydrophobic block.

The hydrophilic block is formulated to provide a vehicle for incorporation of metal nanoparticles into the polymer fuse while simultaneously providing a mechanism by which said nanoparticles could be released from the polymer fuse upon exposure to suitable bodily fluids.

In an embodiment, the hydrophilic block comprises a functionalized polyacrylate having the following formula:

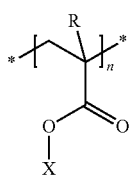

wherein
R is selected from a group consisting of hydrogen, methyl, and trifluoromethyl,
n is an integer from 0 to 500, and
X is a 2-pyridyl pendant group.

In an embodiment, the 2-pyridyl pendant group has the following formula:

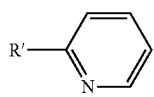

wherein the R'-group of the 2-pyridyl pendant group represents the connectivity to the acrylate ester. In another embodiment, the R'-group of the 2-pyridyl pendant group also further includes one or more additional groups selected from a group consisting of methyl and haloalkane. The haloalkane comprises fluorine, in an embodiment. For example, the haloalkane is a trifluoromethyl. In another embodiment, the haloalkane includes a different halide. In an example, the one or more additional groups have one of the following formulas:

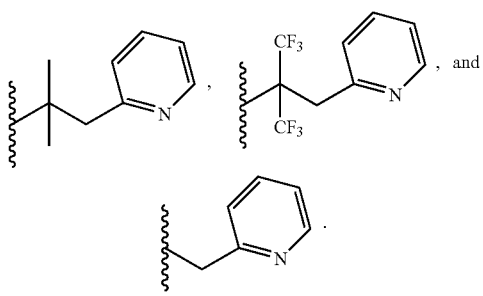

In accordance with another embodiment, the 2-pyridyl pendant group has the following formula:

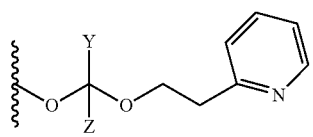

wherein Y is selected from a group consisting of hydrogen and methyl, and Z is selected from a group consisting of hydrogen and methyl and wherein Y and Z can be connected to form a ring.

In still other embodiments, the electrically-conductive material comprises a different polymer that is conductive by virtue of coordinated metal salts. Such material is selected or is formulated to have sensitivity to aqueous environments and/or pH that are similar to those provided in a child or adult person. The electrically-conductive material comprises non-polymeric material, in other embodiments. For example, the electrically-conductive material comprises a starch doped with lithium salts. In another example, other conductive materials are employed.

The polymer fuse 106 is a separate component that is positioned over the electrical source 104, in an embodiment. For example, the polymer fuse 106 can be separately formed and then coupled to the battery 100 via the gasket 142. In another embodiment, the polymer fuse 106 is a coating formed over the electrical source 104. In alternate embodiments, the polymer fuse 106 has a different configuration. Although the polymer fuse 106 is illustrated as being disposed over and in contact with the anode 120, it will be appreciated that the polymer fuse 106 is disposed over and in contact with the cathode 122 in alternate embodiments. To preserve structural integrity of the polymer fuse 106 during operation and/or handling, a protective grid 150 is disposed over the polymer fuse 106. The protective grid 150 has a mesh configuration and is sized to be disposed over a majority of an exposed surface of the polymer fuse 106. In one example, the protective grid 150 has an outer diameter that is substantially equal to that of the planar portion 130 of the polymer fuse 106. Alternatively, the protective grid 150 is smaller in diameter than the planar portion 130 of the polymer fuse 106, and/or the protective grid 150 is a disk, plate or another configuration having openings there through. According to an embodiment, materials suitable for forming the protective grid 150 include but are not limited to a conductive metal such a chromed iron, copper, or stainless steel. In other embodiments, other suitable conductive materials are used to form the protective grid 150.

Figure 2:
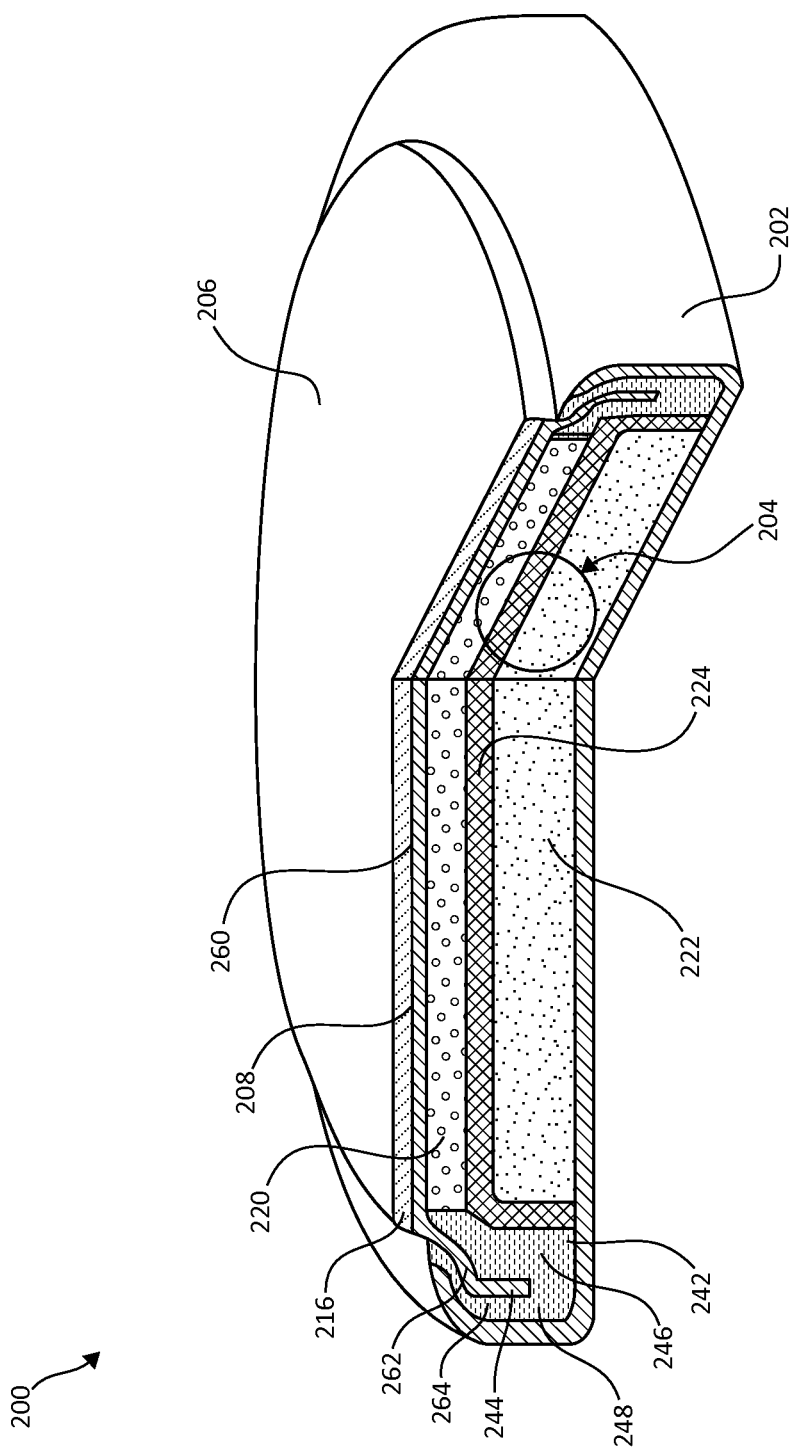
FIG. 2 is a cutaway view of a battery, according to another embodiment of the present invention.

FIG. 2 is a cutaway view of a battery 200, according to another embodiment. The battery 200 is a button-style battery and includes a casing 202, an electrical source 204, a fuse 206, and an anode cap 208. Here, the casing 202 is formed substantially similar to casing 102 of FIG. 1, and an anode 220, a cathode 222, and a separator 224 of the electrical source 204 are formed substantially similar to anode 120, cathode 122, and separator 124 of FIG. 1.

The anode cap 208 is disposed over the anode 220 and over an open top 216 of the casing 202. In an embodiment, the anode cap 208 has a planar portion 260 and a sidewall 262. The planar portion 260 is disk-shaped and contacts the anode 220, and the sidewall 262 of the anode cap 208 extends from an outer periphery of the planar portion 260 at an angle towards the casing 202. In an embodiment, an attachment portion 264 of the sidewall 262 of the anode cap 208 is configured to be inserted into a gasket 242 disposed in the casing 202. More particularly, the gasket 242 has a groove 244 defined between an inner wall 246 and an outer wall 248, and the attachment portion 264 is inserted into the groove 244.

The anode cap 208 is made from a material similar to that used for the casing 202. For example, the anode cap 208 is an electrical conductor or an electrical insulator. According to another embodiment, the anode cap 208 includes one or more materials such as an electrical conductor and an electrical insulator. According to one embodiment, at least a portion of the anode cap 208 includes a conductor, which acts as a terminal of the battery 100.

According to one embodiment, both the anode cap 208 and the casing 202 each act as terminals on the battery 200. In an embodiment, the anode cap 208 acts as a positive terminal while the casing 202 acts as negative terminal of the battery 200, or vice versa. In one embodiment, the casing 202 acts as an end terminal in that electrical connection with the battery 200 may be created with the end of the battery, for example the lower end of the battery 200 that is not visible in FIG. 2. In one embodiment, the casing 202 may act as a side terminal in that electrical connection with the battery 200 may be created on the side of the battery.

The polymer fuse 206 is disposed over the anode cap 208 and allows electricity to be conducted to the anode cap 208 when the polymer fuse 206 is intact, but to decompose as described elsewhere upon contact with the bodily fluid. Here, the polymer fuse 206 is formed of substantially the same material as described in relation to fuse 106 of FIG. 1. The polymer fuse 206 is formed as a coating over the anode cap 208 in FIG. 2, but can have a different configuration in another embodiment. For example, the polymer fuse 206 is a separate component that is overlayed onto the anode cap 208.

Figure 3:
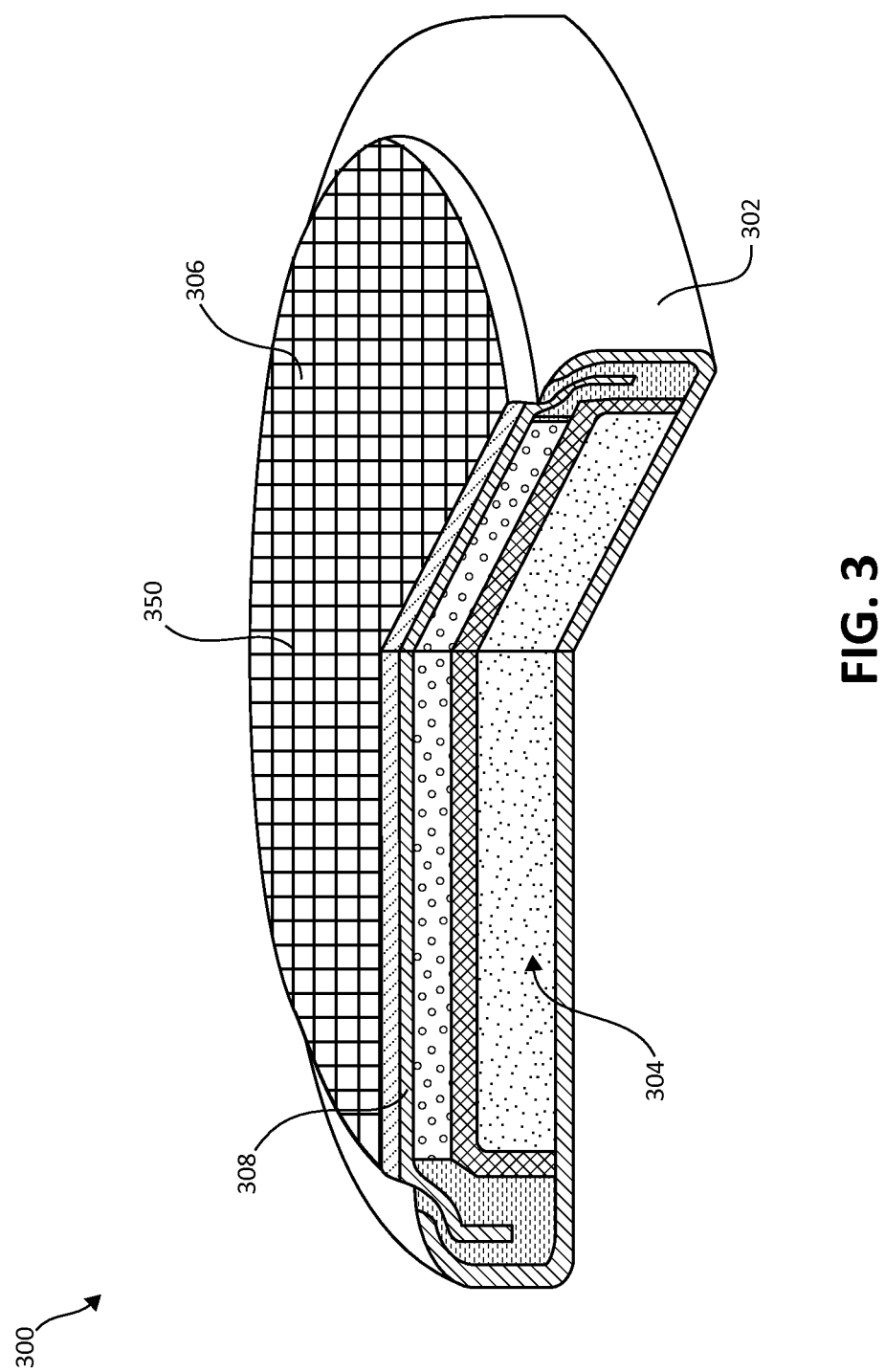
FIG. 3 is a cutaway view of a battery, according to still another embodiment of the present invention.

FIG. 3 is a cutaway view of a battery 300, according to another embodiment. The battery 300 is a button-style battery and includes a casing 302, an electrical source 304, a fuse 306, and an anode cap 308 formed substantially similar to casing 102, 202, electrical source 104, 204, and fuse 106 and 206 of FIGS. 1 and 2, and anode cap 208 of FIG. 2. Battery 300 also includes a protective grid 350 disposed over the polymer fuse 306. The protective grid 350 is formed substantially similar to protective grid 150 of FIG. 1.

Figure 4:
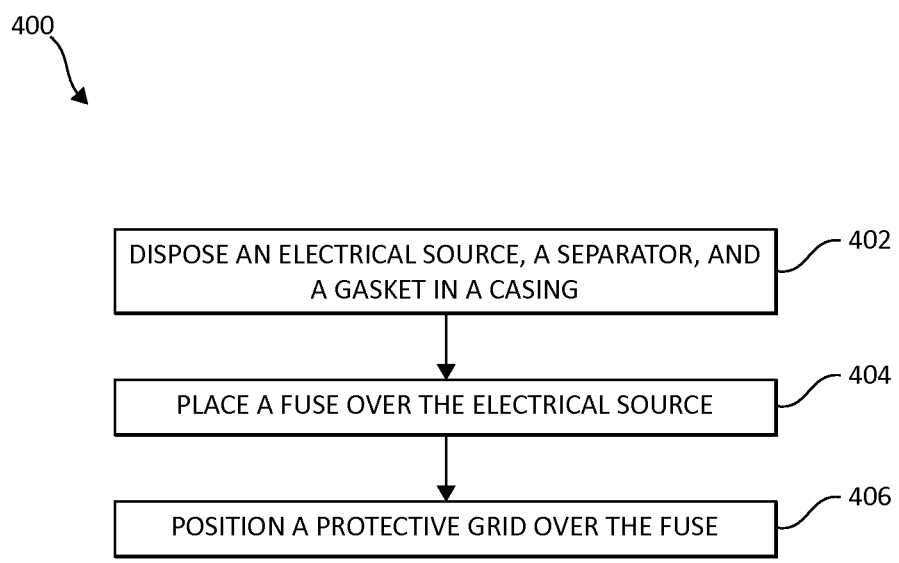
FIG. 4 is a flow diagram of a method of manufacturing a battery, according to one embodiment of the present invention.

FIG. 4 is a flow diagram of a method 400 of forming a battery (e.g., battery 100, 200, 300), according to an embodiment. In an example, an electrical source (e.g., an anode 120, 220 and a cathode 122, 222), a separator (e.g., separator 124, 224) and a gasket (e.g., gasket 142, 242) are disposed in a casing (e.g., casing 102, 202, 302), step 402. In an embodiment, a portion of the anode of the electrical source is inserted into the gasket. In another embodiment, the battery is an off-the-shelf battery including an anode cap (e.g., anode cap 208) disposed over the anode. Outer edges of the anode cap are disposed in a groove of the gasket.

Next, a polymer fuse is placed over the electrical source, step 404. According to an embodiment, the polymer fuse (e.g., fuse 106, 206, 306) comprises an electrically-conductive material made up of a block copolymer similar to that described above. The block copolymer is initially formed by a standard Living Polymerization technique, such as RAFT (Reversible Addition-Fragmentation Chain Transfer polymerization), ATRP (Atom Transfer Radical Polymerization), or another process known to those skilled in the art for forming block copolymers. For example, one or more monomers suitable for forming selected hydrophobic blocks and selected hydrophilic blocks are processed to form the block copolymer. In an embodiment, the hydrophobic and hydrophilic blocks self-assemble to form a pattern.

After the electrically-conductive material is formed, the material is suitably dimensioned and configured into a fuse having dimensions and a shape similar to fuse 106, 206, or 306 and the polymer fuse is disposed over the electrical source, in an embodiment. In accordance with an embodiment in which the battery omits an anode cap, the polymer fuse is positioned over the anode. An attachment flange, which may be included on the polymer fuse, is inserted into the groove of the gasket to maintain the polymer fuse in position over the anode. In another embodiment in which the battery includes the anode cap, the electrically-conductive material is spin-applied over the anode cap to form the polymer fuse. In other embodiments, the electrically-conductive material is applied in a different manner to form a coating over the anode cap.

Optionally, a protective grid is positioned over the polymer fuse, step 406. According to an embodiment, a protective grid (e.g., protective grid 150, 350) is pre-formed and suitably dimensioned to be positioned over the anode or anode cap. In particular, the protective grid is a wire mesh or mesh material comprising a conductive material similar to that described in conjunction with protective grid 150, and the mesh material is formed into a suitable shape. The mesh is then placed over the polymer fuse and press fit into the electrically-conductive material. In an embodiment, fastening mechanisms or adhesives are employed to hold the mesh in position over the polymer fuse.

During normal operation, the polymer fuse 106, 206 is intact and allows current to flow from one terminal of the battery 100, 200, 300 to another. In an event in which the battery 100, 200, 300 is swallowed or comes into contact with bodily fluids, the polymer fuse 106, 206 begins to decompose in a manner designed to render the polymer fuse non-conductive. For example, the electrically-conductive portion of the polymer fuse 106, 206 reacts with the bodily fluid and the polymer fuse 106, 206 loses structural integrity. As a result, the electrically-conductive portion of the polymer fuse disintegrates so that the polymer fuse 106, 206 becomes non-conductive and prevents current flow between the battery terminals.

In an example, the polymer fuse material comprises a block copolymer comprising polystyrene and a polyacrylate having a pendant 2-pyridyl moiety coordinated with a metallic entity. Should the battery become lodged in a body part of a child or adult, a caustic environment may be set up by a runaway current flow between the battery terminals through surrounding tissue thus degrading an ester linkage of the 2-pyridyl moiety to render the block copolymer non-conductive and the battery inoperable. If the battery is lodged in a stomach of the child or adult, an acid environment of the stomach inactivates the coordinating properties of the 2-pyridyl moiety to render the block copolymer non-conductive and the battery inoperable. Further, in an embodiment described above wherein the pendant 2-pyridyl moiety is linked to the polymer backbone via an acetal linkage, the acid environment of the stomach serves to decompose said acetal thus rendering the block copolymer non-conductive and the battery inoperable.

An improved battery has now been provided that allows for the utility of small form factor batteries, but also decreases the risks of harm in case of swallowing by an adult or child. By including a polymer fuse 106, 206, 306 in the form of a coating or overlay, the battery size is slightly increased relative to conventional small form factor batteries. Conventional small form factor batteries can be retrofitted with the polymer fuse 106, 206, 306 to provide the improved battery. Additionally, forming the polymer fuse 106, 206, 306 from electrically-conductive material that disintegrates when contacted with bodily fluids insures that current flow between the battery terminals is prevented to hereby render the battery inoperable when in the child's or adult's body. Moreover, the electrically-conductive material can be tailored to react with bodily fluids of a selected pH or composition to thereby target circumstances under which the polymer fuse disintegrates and renders the battery inoperable.

While at least one exemplary embodiment has been presented in the foregoing detailed description, it should be appreciated that a vast number of variations exist. It should also be appreciated that the exemplary embodiment or embodiments described herein are not intended to limit the scope, applicability, or configuration of the claimed subject matter in any way. Rather, the foregoing detailed description will provide those skilled in the art with a convenient road map for implementing the described embodiment or embodiments. It should be understood that various changes can be made in the function and arrangement of elements without departing from the scope defined by the claims, which includes known equivalents and foreseeable equivalents at the time of filing this patent application.

What is claimed is:

1. A battery comprising:
a casing;
an anode coupled to the casing;
an electrical source disposed between the casing and the anode; and
a polymer fuse comprising an electrically-conductive material, said material becoming non-conductive upon contact with a bodily fluid.

2. The battery of claim 1, wherein the polymer fuse is over at least a portion of the anode, and the electrically-conductive material comprises a block copolymer including a hydrophobic block and a hydrophilic block formulated to provide electrical communication between the anode and the electrical source.

3. The battery of claim 2, wherein the hydrophobic block has a Formula I:

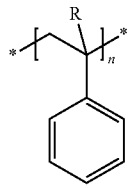

wherein R is selected from a group consisting of hydrogen, methyl, and trifluoromethyl, and n is an integer from 1 to 500.

4. The battery of claim 3, wherein the hydrophilic block includes an acrylate ester and has a Formula II:

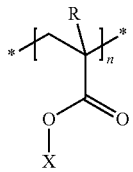

wherein
R is selected from a group consisting of hydrogen, methyl, and trifluoromethyl,
n is an integer from 1 to 500, and
X is a 2-pyridyl pendant group.

5. The battery of claim 4, wherein the 2-pyridyl pendant group has Formula III:

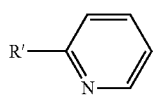

and R' represents the connectivity to the acrylate ester.

6. The battery of claim 5, wherein:
the 2-pyridyl pendant group further includes one or more groups selected from a group consisting of methyl and haloalkane.

7. The battery of claim 6, wherein the 2-pyridyl pendant group is selected from a group consisting of

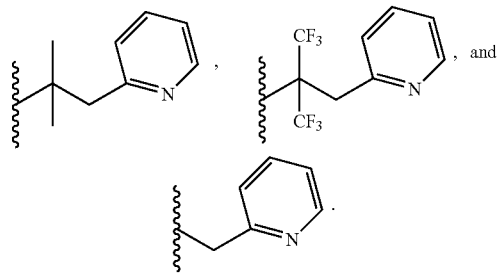

8. The battery of claim 4, wherein:
X is

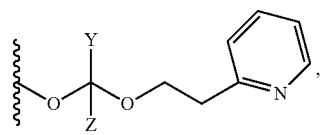

Y is selected from a group consisting of hydrogen and methyl, and
Z is selected from a group consisting of hydrogen and methyl, and Y and Z can be connected to form a ring.

9. The battery of claim 1, further comprising an anode cap disposed over the anode, wherein the polymer fuse is formed over the anode cap.

10. The battery of claim 1, further comprising a grid disposed over the polymer fuse.

11. The battery of claim 10, wherein the grid comprises a conductive material.

12. The battery of claim 11, wherein the conductive material comprises a material selected from a group consisting of chromed iron, copper, and stainless steel.

13. A battery comprising:
a casing;
an anode coupled to the casing;
an anode cap coupled to the casing and anode;
an electrical source disposed between the casing and the anode cap;
a polymer fuse over at least a portion of the anode cap, the polymer fuse comprising an electrically-conductive material formulated to at least partially decompose upon contact with a bodily fluid and to provide electrical communication between the anode cap and the electrical source when the polymer fuse is intact; and
a protective grid disposed on the polymer fuse.

14. The battery of claim 13, wherein the polymer fuse is over at least a portion of the anode, and the electrically-conductive material comprises a block copolymer including a hydrophobic block and a hydrophilic block formulated to provide electrical communication between the anode and the electrical source.

15. The battery of claim 13, wherein:
the hydrophobic block has a Formula I:

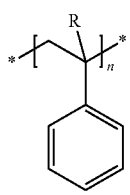

wherein R is selected from a group consisting of hydrogen, methyl, and trifluoromethyl, and n is an integer from 1 to 500, and
the hydrophilic block has a Formula II:

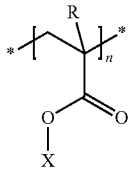

wherein R is selected from a group consisting of hydrogen, methyl, and trifluoromethyl, n is an integer from 1 to 500, and X is a 2-pyridyl pendant group.

16. A method of manufacturing a battery comprising:
providing a casing, an anode coupled to the casing, and an electrical source disposed between the casing and the anode; and
forming a polymer fuse, the polymer fuse comprising an electrically-conductive material formulated to at least partially decompose upon contact with a bodily fluid.

17. The method of claim 16, wherein the step of providing comprises providing an anode cap over the anode, the anode cap coupled to the casing, and the step of forming a polymer fuse comprises coating the anode cap with the electrically-conductive material to provide electrical communication between the anode and the electrical source when the polymer fuse is intact.

18. The method of claim 17, further comprising placing a protective grid over the polymer fuse.

19. The method of claim 17, wherein the step of forming includes spin-applying the polymer fuse over the anode cap.

20. The method of claim 16, wherein the electrically-conductive material comprises a block copolymer material including a hydrophobic block and a hydrophilic block.

21. The method of claim 20, wherein the step of forming includes self-assembling the block copolymer material by implementing a standard curing technique.

* * * * *